Sept. 22, 1953 G. C. ARMSTRONG 2,653,051
THERMOSTATIC SNAP DISK RELAY
Filed Sept. 3, 1949
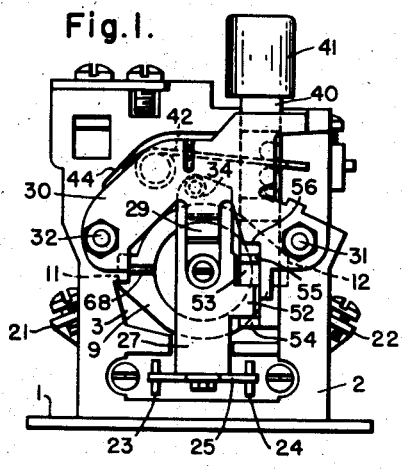
Fig.1.
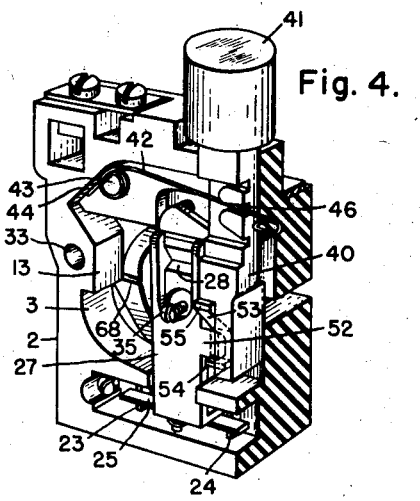
Fig. 4.
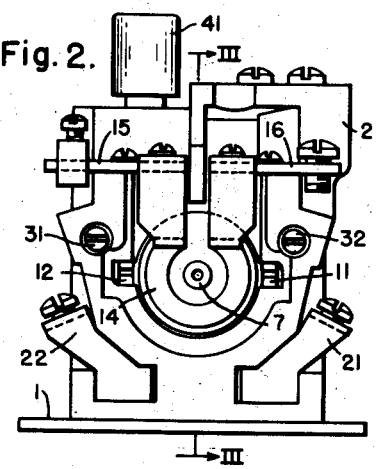
Fig. 2.
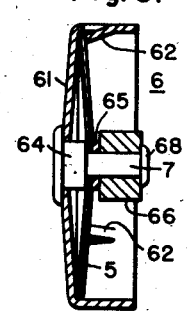
Fig. 6.
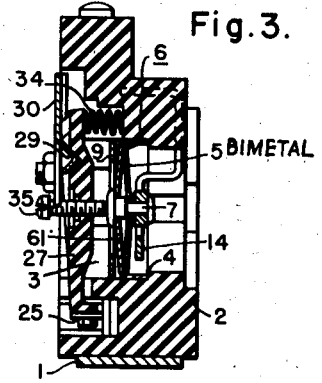
Fig. 3.
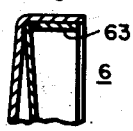
Fig. 7.
Fig. 5.
WITNESSES:
Edward Michaels
Leon M. Garman
INVENTOR
George C. Armstrong.
BY
ATTORNEY Patented Sept. 22, 1953

2,653,051

UNITED STATES PATENT OFFICE 2,653,051

THERMOSTATIC SNAP DISK RELAY

George C. Armstrong, Buffalo, N. Y., assignor to Westinghouse Electric Corporation, East Pittsburgh, Pa., a corporation of Pennsylvania Application September 3, 1949, Serial No. 114,049

5 Claims. (Cl. 297—15)

My invention relates to thermostatic snap disc devices such as used in electric overload relays of the type known for instance from Patents 2,195,012 and 2,414,513.

It is an object of my invention to improve and simplify the manner and means of mounting a thermostatic snap disc device on the appertaining insulating base, for instance, on the insulating body of an electric contactor or overload relay to be controlled by the thermostatic device.

Another object of my invention is to improve the manufacture of such thermostatic snap disc devices so as to secure a high accuracy of thermal calibration by a simple and easily applicable fabricating method.

These and more specific objects, as well as the means and method for achieving them according to the invention, will be apparent from the following description in conjunction with the embodiments exemplified by the drawing in which:

Figs. 1 and 2 show two lateral views of an overload relay, the two views being taken from opposite sides of the relay respectively.

Fig. 3 is a cross-section of the same relay extending along a plane denoted in Fig. 2 by III—III.

Fig. 4 is a part sectional perspective view of the same relay with an appertaining cover plate removed to show the interior; the front side of the perspective view is identical with the one shown in Fig. 1.

Fig. 5 is an exploded illustration of the thermostat assembly and heater appertaining to the same relay.

Fig. 6 shows a cross-section of part of the thermostat assembly, and

Fig. 7 shows a cross-section of part of a similar assembly of a somewhat modified design.

The illustrated relay serves to protect an electric circuit or apparatus from damage due to overload by actuating an electric switch in response to the heat transmitted by an overload-responsive heater to a thermostatic snap disc assembly. The switch, in turn, controls a cutout contactor or the like device (not shown) for disconnecting the circuit or apparatus to be protected.

The relay has a sheet-metal base plate 1 firmly attached to an insulating body 2 of molded material. The body 2 has a cavity 3 with a circular ledge or shoulder 4 (Fig. 3) against which is seated a thermostatic assembly. This assembly is composed of a curved snap disc 5 of bimetal, a cup-shaped retainer 6, and a stud 7 which holds parts 5 and 6 together. The center bore in the bottom of cup 6, traversed by the head portion of stud 7, is wider than the adjacent stud diameter so that, when disc 5 is sufficiently heated, its center can snap toward the left (Fig. 3) and moves the stud 7 through the bore of cup 6 toward a contact member.

The cup-and-disc assembly is secured in base 1 with the aid of an annular member 9 of spring steel which has two diametrically opposite, radially projecting lugs 11, 12 that can pass through a corresponding key hole slot of body 2 and, within cavity 3, engage two corresponding projections of the insulating body 2, one of these projections being visible in Fig. 4 at 13. The lugs and projections form together a bayonet-type lock which permits introducing the cup-and-disc assembly and the spring 9 from the left of Fig. 3 when the spring is in one angular position, and then fastening the assembly and spring merely by applying pressure to the spring while turning it into locking position.

The above-mentioned thermostat assembly and its attachment to body 2 involve essential features of the invention. Before explaining them more in detail, however, the description of the other parts of the relay will first be completed to facilitate understanding the purpose, and functional advantages of the invention.

The bimetal disc 5 is heated indirectly by a heater 14 of resistance material which is attached to two terminals 15, 16. A loop portion of heater 14 lies in the cavity of the insulating body 2 close to the bimetal disc 5. The terminals 15, 16 are mounted on the insulating body 2. When using the relay, the terminals 15 and 16 are connected in the circuit to be protected. Then, the load current flows through the heater 14 so that the heat produced by the heater and transmitted to the disc 5 is a measure of the current. The disc will snap if this current exceeds given overload conditions. The heater is exchangeable for others of different rating to make the relay applicable for different rated load currents.

The switch to be actuated by the thermostatic assembly has two terminals 21 and 22 mounted on body 2 and integral with respective stationary contacts 23 and 24 which cooperate with a contact bridge 25. Bridge 25 is attached to a rigid arm 27 of insulating material which has a groove 28 (Fig. 4) engaged by an angularly bent nose 29 of a sheet-metal plate 30 (Figs. 1, 3). Plate 30 is attached to body 2 by two screws 31, 32. One of the holes in body 2 for the passage of the screws is visible in Fig. 4 at 33. Nose 29 and groove 28 form together the pivot bearing for arm 27. A biasing spring 34 is disposed between the upper end of arm 27 and the body 2 and tends to keep arm 27 and contact bridge 25 in the illustrated contact-closing position. A spacing screw 35 is threaded through the arm 27 and has its inner end engageable by the head of member 7. When, due to overload, the bimetal disc 5 snaps toward the left (Fig. 3), the head of stud 7 abuts against the screw 35 and moves the arm 27 clockwise (Fig. 3) about its pivot, thus moving the contact bridge 25 away from the stationary contacts 23 and 24.

The use of the relay is such that the just-mentioned movement of contact bridge 25 causes an interruption of the circuit for the electric heater element 14 so that the disc 5 is no longer heated. As soon as disc 4 has cooled to a predetermined lower temperature, it snaps back into the illustrated, normal position. The arm 27, however, is arrested in its contact-opening position so that, after the cooling and return movement of disc 4, a manual operation is necessary to make arm 27 reclose the relay contacts. The means for the manually controllable reclosing of the relay will be described presently.

A plunger 40 of insulating material is slidable in a groove of body 2 but not revolvable relative to the body. The upper portion of plunger 40, outside body 2, is shaped as a push button 41. The groove for guiding the plunger 40 is open toward the plate 30, but the plunger is held in the groove when the plate 30 is attached. A wire spring 42 has a coiled portion loosely surrounding a boss 43 (Fig. 4) of insulating material molded as an integral part of the insulating body 2. One end of spring 42 abuts at 44 against an adjacent inner wall surface of body 2, while the other end of spring 42 passes through a notch of plunger 40. The force of spring 42 acts upwardly on plunger and push button. When the relay contacts are closed, a stop projection 54 of plunger 40 abuts against a nose 52 of arm 27 (Figs. 1, 4). When, due to overload response, the arm 27 moves to the contact-open position, its nose 52 is lifted toward the observer (Figs. 1, 4) and out of engagement with the stop projection 54 of plunger 40. The plunger, under the bias of spring 42, is now free to move upwardly until another stop projection 55 of the plunger abuts against a stop face 56 of the plate 30 (Fig. 1). In the position then reached by the plunger 40, its other stop projection 54 lies behind the nose 52 of arm 27 and prevents the arm from returning to the contact-closed position even after the thermostatic device has cooled and returned to its normal position. It is, therefore, necessary that the operator depress the button 41 for reclosing the relay contacts. During the downward movement of the plunger, the stop projection 54 slides below the nose 52 of arm 27 so that the arm is suddenly released to snap back to the closed-contact position.

It is possible to manually open the relay contacts, for instance, to stop a motor controlled by the relay. To this end, the operator has to depress the button 41 farther than just-mentioned until a bevel face 53 (Figs. 1, 4) of plunger 40 engages and lifts the nose 52 of arm 27 thus opening the relay contacts as long as the push button is held depressed by the operator.

The illustrated relay has a design which permits a selective setting of the relay to two modes of operation different from the one described in the foregoing. In one of these other settings, the just-mentioned manual opening of the relay contacts is prevented. In the remaining setting, the locking engagement between the plunger and the contact arm is prevented so that the relay contacts close automatically, i. e., without manual resetting, when the thermostatic snap disc, after responding to heat, cools down and snaps back to its original shape. These possible settings are not further described in this specification because the particular design of the switching or resetting devices is not essential to the invention proper, and is described more in detail in the copending application Serial No. 124,742, filed November 1, 1949, now Patent No. 2,571,812, and entitled Thermostatic Overload Relay which is assigned to the assignee of this invention. The switching and resetting means disclosed in the co-pending application have been chosen for illustration in conjunction with the present invention because the first commercial application of the invention was in connection with relays of this particular design. It should be understood, however, that the invention is also applicable for other relay designs, for instance, those shown in the above-mentioned two patents; and the invention is also applicable for thermostatically controlled devices other than overload relays, for instance, in devices without resetting or manual contact-opening devices, such as used for the automatic control of temperature.

Reverting now to the thermostatic snap disc device according to the invention proper, it will be recognized that the cup-shaped retainer 6 has a curved bottom 61 (Fig. 6) which bulges outwardly. The snap disc 5, when cold, bulges away from the bottom 61, and is secured within the retainer cup so that only the periphery of the disc 5 abuts against the peripheral portion of the cup bottom 61. The disc 5 is secured in this position by means of tongues or lugs 62 which are cut out of the peripheral wall of the retainer 6 and project toward and over the disc 5 (Fig. 6). Of course, other means of securing the disc 5 within the retainer cup 6 are also applicable. For instance, according to Fig. 7, a ring 63 is press-fitted into the cup 6 for this purpose. There is sufficient play between the tongues 62 or ring 63 and the bottom of the cup to permit some movement of the disc periphery relative to the cup. When the disc 5 is cold, however, it is forced under tension against the bottom of the retainer cup. This force is maintained by the riveting stud connection explained presently.

The stud 7 has a relatively large head portion which, as mentioned, extends freely through the centerbore of cup bottom 61. The head portion has a shoulder outside the retainer cup so as to abut against the bottom 61. Seated on the shaft portion of the stud 7 are a washer 65 and a sleeve 66 (Figs. 5, 6). The stud 7 has a bore 67 (Fig. 5). After disc 5, cup 6, stud 7, washer 65 and sleeve 66 are assembled, the bored end of stud 7 is riveted over the sleeve 66 thereby securing the parts of this assembly together. The riveting can be effected in the customary manner by spinning the bored end over the sleeve 66, or by having the bored end rest against a punch and applying pressure against the head 64 of stud 7. During this riveting or spinning operation, the effective length of the stud is shortened.

The temperature at which a bimetal disc will snap from one curvature to the other depends not only on the bimetal design and composition, but also on the initial tension of the disc. Consequently, the thermostat assembly, according to the invention, can be calibrated for operation within specified temperature limits by carrying the stud-shortening riveting or spinning operation just to that point where the tension under which the disc 5 is forced against the cup bottom is as needed to secure a snap operation at the desired temperature.

According to a feature of the invention, the riveting or spinning operation is performed while the thermostat assembly is being kept at a temperature within the specified limits. Preferably, this is done by submerging the thermostat assembly in a bath, for instance, of oil kept at the proper temperature, and then spinning the stud end over the sleeve 66 within the heated oil bath. As the riveting proceeds, a point will be reached where the effective length of the gradually shortened stud causes just the right pressure to be exerted on the disc to make it snap at the bath temperature. Then the riveting is stopped, for instance, automatically by the disc snapping the stud away from the counterpunch, and the assembly can be removed and requires no further thermal calibration. After the thermostat assembly is inserted and fastened in the appertaining insulating base, the contact travel caused by the snapping of the disc can be adjusted by means of the screw 35 (Fig. 3).

As mentioned, the thermostat assembly is held in the appertaining insulating base by means of the flat annular spring 9. In its unflexed condition, the spring 9 is curved as apparent from Fig. 5. When it is placed into the key slot of the insulating base and then put under compression previous to turning its lugs 11 and 12 behind the locking projections of the base, the spring assumes a substantially flat shape (Fig. 3), and thus applies pressure against the bottom of the retainer cup 6, thus forcing the retainer against the circular shoulder 4 of the insulating base. In order to facilitate turning the spring 9 into the fastening position, while securing a high degree of fastening pressure once the spring is properly seated, its lugs 11 and 12 are provided with ridges 68 (Figs. 1, 5). Consequently, little pressure is necessary, after passing the spring 9 through the key slot of the insulating base, for turning the spring into initial engagement with the locking projections of body 2. However, as soon as the ridges 68 enter into engagement with the projections, the pressure increases considerably so that, when the spring is in its final position, the desired high pressure is exerted against the retainer cup, and the friction between the spring and the projections of the base is correspondingly large. In this manner a simple and easy manner of assembling the thermostat with the insulating base is achieved as well as a secure fastening of the assembly in the base. Besides, the space requirements of the thermostat assembly and particularly of the appertaining fastening means is considerably reduced, for instance, as compared with the thermostat devices according to the above-mentioned patents.

It will be obvious to those skilled in the art, after a study of this disclosure, that thermostatic devices according to the invention can be modified and altered in various respects and may be incorporated in designs other than those shown and specifically described in this disclosure, without departing from the objects of my invention and within the scope of its essential features as set forth in the claims annexed hereto.

I claim as my invention:

1. The method of assembling and calibrating a thermostatic snap disc within an appertaining retainer, which comprises placing the disc in the retainer, passing a calibrating tension member through aligned center holes of retainer and disc, securing said disc and retainer between the ends of said tension member, placing the assembled parts in a heated liquid and heating the assembled parts to the temperature at which the disc is to snap, and shortening said tension member at said temperature until the disc snaps.

2. The method of assembling and calibrating a thermostatic snap disc within an appertaining retainer, which comprises placing the disc in the retainer, passing a calibrating tension rivet having a head on one end thereof through aligned center holes of retainer and disc, placing the assembled parts in a liquid heated to the temperature at which the disc is to snap, and forming a head on the other end of the rivet within the liquid to shorten the rivet and preload the disc until the disc snaps.

3. A calibrated snap-acting thermostatic device comprising, a cup-shaped support having an outwardly curved end plate, a curved disc bimetallic element disposed in said support, the concave face of said disc confronting the concave face of said end plate, means connected to said support loosely engaging the peripheral edge of said disc to prevent appreciable axial displacement of said disc relative to said support, said end plate having a hole therethrough substantially centrally thereof, said disc having a hole therethrough substantially centrally thereof coaxially disposed of said hole in said end plate and of smaller diameter, a calibrating tension member having a head and a shank, said shank comprising two different diameter sections separated by a shoulder, a larger section adjacent said head and a smaller section extending from said larger section, said tension member fitting through said holes, said head engaging the convex outer face of said end plate, said larger section extending through said hole in said end plate, said smaller section extending through said hole in said disc, the shoulder on said shank being spaced from said disc, and means connected with said smaller section engageable with said disc for deflecting said disc to a position adjacent said shoulder to preload said disc.

4. A calibrated snap-acting thermostatic device comprising, a cup-shaped support having an outwardly curved end plate, a curved disc bimetallic element disposed in said support, the concave face of said disc confronting the concave face of said end plate, means connected to said support loosely engaging the peripheral edge of said disc to prevent appreciable axial displacement of said disc relative to said support, said end plate having a hole therethrough substantially centrally thereof, said disc having a hole therethrough substantially centrally thereof coaxially disposed of said hole in said end plate and of smaller diameter, a calibrating tension member having a head and a shank, said shank comprising two different diameter sections separated by a shoulder, a larger section adjacent said head and a smaller section extending from said larger section, said tension member fitting through said holes, said head engaging the convex outer face of said end plate, said larger section extending through said hole in said end plate, said smaller section extending through said hole in said disc, the shoulder on said shank being spaced from said disc, a rivet head on the end of said smaller section engaging the convex face of said disc, said rivet head occupying a position axially of said tension member in which said disc is deflected toward said end plate, said axial position being determined by heating said bimetallic disc to an operating temperature and deflecting said disc by said rivet head on said tension member until the curvature of said disc reverses.

5. A calibrated snap-acting thermostatic device comprising, a curved support having a hole therethrough, a curved snap-acting bimetallic element having a hole therethrough, said bimetallic element being disposed on said support with the concave face thereof confronting the concave face of said support and with the extremities of said bimetallic element engaging said support, said hole in said bimetallic element being coaxially disposed of the hole in said support, a tension member having a head and a shank portion of lesser length than the distance between said holes, said shank portion fitting through said hole in said support and said head engaging the convex face of said support, the diameter of the hole in said bimetallic element being less than the diameter of said shank portion, means engaging the convex face of said bimetallic element and said shank portion through said hole in said bimetallic element, drawing said bimetallic element toward the end of said shank portion and preloading said bimetallic element, said bimetallic element when heated deflecting toward said support and thrusting said shank portion through said hole in said support displacing said head away from the convex face of said support.

GEORGE C. ARMSTRONG.

References Cited in the file of this patent

UNITED STATES PATENTS

| Number | Name | Date |
|---|---|---|
| 1,656,392 | Russell et al. | Jan. 17, 1928 |
| 1,897,316 | Marshall | Feb. 14, 1933 |
| 1,923,882 | Pickup | Aug. 22, 1933 |
| 2,044,276 | Bukolt | June 16, 1936 |
| 2,106,577 | Sherbondy | Jan. 25, 1938 |
| 2,195,012 | Pierce | Mar. 26, 1940 |
| 2,239,540 | Spencer | Apr. 11, 1941 |
| 2,295,312 | Lee | Oct. 14, 1941 |
| 2,264,276 | Clark et al. | Dec. 2, 1941 |
| 2,288,818 | Marcy | July 7, 1942 |
| 2,301,318 | Peo | Nov. 10, 1942 |
| 2,320,873 | Lee | June 1, 1943 |
| 2,361,193 | Gray | Oct. 24, 1944 |
| 2,490,320 | Pashby | Dec. 6, 1949 |